United States Patent [19]
Hendrickson

[11] Patent Number: 5,940,435
[45] Date of Patent: Aug. 17, 1999

[54] METHOD FOR COMPENSATING FILTERING DELAYS IN A SPREAD-SPECTRUM RECEIVER

[75] Inventor: Alan F. Hendrickson, Austin, Tex.

[73] Assignee: DSP Group, Inc., Santa Clara, Calif.

[21] Appl. No.: 09/078,145

[22] Filed: May 13, 1998

Related U.S. Application Data

[63] Continuation-in-part of application No. 08/976,175, Nov. 21, 1997
[60] Provisional application No. 60/031,350, Nov. 21, 1996.
[51] Int. Cl.$^6$ ............... H04B 15/00; H04K 1/00; H04L 27/30; H04L 27/14
[52] U.S. Cl. ............ 375/206; 375/208; 375/326; 375/332; 375/359; 375/360; 375/371; 375/373
[58] Field of Search ................... 375/206, 208, 375/209, 210, 279, 281, 326, 332, 359, 360, 371, 373

[56] References Cited

U.S. PATENT DOCUMENTS

| | | | |
|---|---|---|---|
| 5,680,414 | 10/1997 | Durrant et al. | 375/206 |
| 5,689,525 | 11/1997 | Takeishi et al. | 375/206 |
| 5,761,239 | 6/1998 | Gold et al. | 375/206 |
| 5,844,935 | 12/1998 | Shoji | 375/200 |

OTHER PUBLICATIONS

Sklar, "Digital Communications: Fundamentals and Applications," P T R Prentice Hall, Englewood Cliffs, New Jersey, 1988, pp. 453–460.

Primary Examiner—Stephen Chin
Assistant Examiner—Michael W. Maddox
Attorney, Agent, or Firm—Conley, Rose & Tayon; Cyrus F. Bharucha; Jeffrey C. Hood

[57] ABSTRACT

A method for configuring the receiver with an IF delay value that indicates the timing of symbol transitions in a received signal processed by the receiver. The receiver recovers a timing that has the same period as the symbol period, but which is out of phase with the received symbols. The received symbols are members of a constellation with elements that have purely I or purely Q components. A symbol-quality signal is generated by constructing the quantity $\||I|-|Q|\|$. This quantity is a maximum when the detected symbols are aligned with the expected points in the symbol constellation, and decreases if the detected symbols are rotated away from these constellation points. The method determines an optimal delay value by which the symbol clock should be shifted from the recovered timing by using the symbol-quality signal to evaluate test delays and to successively refine them until the optimal delay value is found.

9 Claims, 6 Drawing Sheets

METHOD FOR COMPENSATING FILTERING DELAYS IN A SPREAD-SPECTRUM RECEIVER

This application is a continuation-in-part of U.S. application Ser. No. 08/976,175 titled "Timing Recovery for a Pseudo-Random Noise Sequence in a Direct-Sequence Spread-Spectrum Communications System," by inventors Alan Hendrickson and Ken Tallo, filed on Nov. 21, 1997, and assigned to the assignee of this application; which in turn claims the benefit of priority of U.S. Provisional Application No. 60/031,350 titled "Spread Spectrum Cordless Telephone System and Method," by inventors Alan Hendrickson, Paul Schnizlein, Stephen T. Janesch, and Ed Bell, filed on Nov. 21, 1996.

BACKGROUND OF THE INVENTION

1. Field of the Invention

The invention relates to electronic communication and, more particularly, to symbol-clock recovery in a digital receiver.

2. Description of the Related Art

Electronic communication is generally accomplished through a carrier wave that is modulated to bear data from a transmitting unit to a receiving unit. The transmission of digital data involves several steps, including partitioning the data into a sequence of symbols, modulating the carrier wave with the sequence of symbols to produce the transmitted signal, and propagating the transmitted signal through a communication channel. The received signal is received by the receiver which demodulates it to extract the received symbols. Finally, the receiver quantizes the symbols to reproduce the transmitted digital data.

An important component of the receiver is a symbol clock used in demodulating the received signal and quantizing the symbols. The symbol clock generates a signal at the symbol rate of the received signal. The symbol clock indicates the boundaries between symbols in the received signal, and is an important input to various elements in the receiver such as matched filters, differential decoders, and slicers. If the symbol clock signal deviates from the correct timing of the symbol boundaries, the function of all of these components is degraded, increasing the receiver's error rate. It is therefore helpful to have a system for evaluating the symbol clock and detecting drifts in its phase from the timing of the symbol sequence.

Prior-art symbol-timing recovery circuits use open-loop synchronizers, which use no feedback to the symbol clock, and closed-loop synchronizers, which test small shifts in the symbol timing for improved symbol synchronization and adjust the symbol clock accordingly. The closed-loop synchronizers, such as early/late-gate loops and tau-dither loops, generate error signals indicative of the phase offset between the symbol boundaries and the symbol clock. The early/late-gate loops depend on symbol transitions to generate the error signals. Hence, they are prone to drifting from the correct symbol timing when the received signal contains a run of repeated symbols. This problem is reduced by having better-balanced integrators or by using a tau-dither loop, but both of these measures add significantly to the complexity of the synchronizers.

Under certain conditions, such as when the symbol clock is derived from a frame clock or a spreading code chip clock, a relatively slow (requiring several symbol periods) measure of the symbol quality is adequate for providing the feedback to the symbol clock. A system built from simple circuit elements to provide this measure would be a valuable tool in the design of communications receivers.

Such a system could also be used to configure a receiver with an appropriate timing for its symbol clock. If a receiver derives its symbol clock from another clock that has the same frequency but has a phase offset from the symbol transitions, then this system for evaluating the symbol clock would provide a simple means for measuring the phase offset at the end of the manufacturing process. The receiver can then be configured to use the measured value as an initial estimate of the offset during future operation.

SUMMARY OF THE INVENTION

One embodiment of the present invention contemplates a system and method for evaluating the quality of symbols in a communications receiver and for adjusting a symbol clock in the receiver so that the symbol quality is maximized. The invention presents a symbol quality detector, comprised in the receiver, that evaluates symbols which have been received by the receiver and detected in a matched filter. The received symbols are elements of a QPSK or DQPSK symbol constellation with additive noise, where all symbol constellation points $\{X_n\}$ can be described in polar coordinates as as $(r, n\pi/2)$ with n=0, 1, 2, 3. Alternatively, the constellation points $\{X_n\}$ can be described in a 2-dimensional Cartesian plane as:

$$\{X_n\} = \{(0,A), (A,0), (-A,0), (0,-A)\}.$$

The projection of a given symbol $X_n$ along the ordinate I is a vector labeled i, and the projection along the abscissa Q is a vector labeled q. The i and q vectors form a 2-dimensional orthonormal vector basis when the amplitude A is appropriately normalized. The projections of the received symbols on the ordinate and abscissa are referred to as the I and Q components of the received symbol, respectively, or more simply, as I and Q. The symbol-quality detector comprises inputs that receive I and Q, and a logic block that generates the symbol-quality signal by constructing the quantity $\||I|-|Q|\|$. This quantity is a maximum when the detected symbols are aligned with the expected points in the symbol constellation; it decreases if the detected symbols are rotated away from these constellation points. In a preferred embodiment of the invention, the symbol-quality detector comprises a latch that permits updates of the symbol-quality signal only during receive cycles, in which the receiver receives data.

The invention further contemplates an arrangement of elements in the logic-block of the symbol-quality detector. In this embodiment, the logic block comprises magnitude detectors that calculate the magnitudes of the I and Q components, an adder that adds the magnitude of the I component with the compliment of the magnitude Q component, thereby generating the difference $|I|-|Q|$, and another magnitude detector that operates on this difference to generate the quantity $\||I|-|Q|\|$.

Still further, the present invention comprises a digital communications receiver that uses a symbol-quality detector to evaluate its symbol clock. Since a poor synchronization will cause the detected symbols to deviate from the expected constellation points, the symbol-quality signal is used in the receiver to measure the synchronization of the symbol clock with the symbol transitions in the received signal. This measure is preferably used to shift a phase of the symbol clock to refine its synchronization with the received symbols.

A second embodiment of the present invention contemplates a method for configuring the receiver with an IF delay value that indicates the timing of symbol transitions in a received signal processed by the receiver. In this embodiment of the invention, the receiver recovers from the received signal a timing that has the same period as the symbol period, but which is out of phase with the received symbols. The method determines an optimal delay value by which the symbol clock should be shifted from the recovered timing so that the symbol clock is in phase with the symbol transitions. The method uses the symbol-quality signal to evaluate test delays and to successively refine them until the optimal delay value is found.

BRIEF DESCRIPTION OF THE DRAWINGS

Other objects and advantages of the invention will become apparent upon reading the following detailed description and upon reference to the accompanying drawings in which.

DETAILED DESCRIPTION OF THE PREFERRED EMBODIMENTS

The following patent applications are hereby incorporated by reference in their entirety as though fully and completely set forth herein:

U.S. Provisional Application No. 60/031,350 titled "Spread Spectrum Cordless Telephone System and Method" and filed Nov. 21, 1996, whose inventors are Alan Hendrickson, Paul Schnizlein, Stephen T. Janesch, and Ed Bell;

U.S. application Ser. No. 08/968,030, titled "Verification of PN Synchronization in a Spread-Spectrum Communications Receiver" and filed Nov. 12, 1997, whose inventor is Alan Hendrickson;

U.S. application Ser. No. 08/974,966, titled "Parity Checking in a Real-Time Digital Communications System" and filed Nov. 20, 1997, whose inventors are Alan Hendrickson and Paul Schnizlein;

U.S. application Ser. No. 08/976,175, titled "Timing Recovery for a Pseudo-Random Noise Sequence in a Direct Sequence Spread Spectrum Communications System" and filed Nov. 21, 1997, whose inventors are Alan Hendrickson and Ken M. Tallo;

U.S. application Ser. No. 09/175,052, titled "Timing Recovery for a Pseudo-Random Noise Sequence in a Direct Sequence Spread Spectrum Communications System" and filed Oct. 19, 1998, whose inventors are Alan Hendrickson and Ken M. Tallo;

U.S. application Ser. No. 08/975,142, titled "Passband DQPSK Detector for a Digital Communications Receiver" and filed Nov. 20, 1997, whose inventors are Alan Hendrickson and Paul Schnizlein;

U.S. application Ser. No. 08/968,202, titled "An Improved Phase Detector for Carrier Recovery in a DQPSK Receiver" and filed Nov. 12, 1997, whose inventors are Stephen T. Janesch, Alan Hendrickson, and Paul Schnizlein;

U.S. application Ser. No. 08/968,028, titled "A Programmable Loop Filter for Carrier Recovery in a Radio Receiver" and filed Nov. 12, 1997, whose inventors are Stephen T. Janesch and Paul Schnizlein;

U.S. application Ser. No. 09/148,263, titled "Acquisition of PN Synchronization with Verification in a Digital Communications System" and filed Sep. 4, 1998, whose inventor is Alan Hendrickson;

U.S. application Ser. No. 08/968,029, titled "A Carrier-Recovery Loop with Stored Initialization in a Radio Receiver" and filed Nov. 12, 1997, whose inventors are Stephen T. Janesch, Paul Schnizlein, and Ed Bell;

U.S. application Ser. No. 08/148,268, titled "Frame Synchronization in a Digital Communication System" and filed Sep. 4, 1998, whose inventor is Alan Hendrickson;

U.S. application Ser. No. 09/082,748, titled "System and Method for Down-Conversion of a Received Signal to an Intermediate Frequency for DSP Processing" and filed May 21, 1998, whose inventors are Stephen T. Janesch, Paul Schnizlein, Alan Hendrickson, and Ed Bell.

Figure 1A:
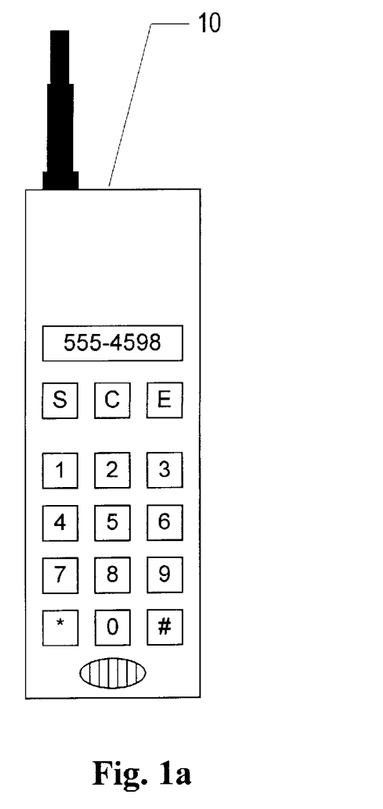
FIGS. 1A–1C show a representative direct sequence spread spectrum transceiver, a block diagram of the primary modules in the transceiver, and a schematic of the transceiver.
Figure 1B:
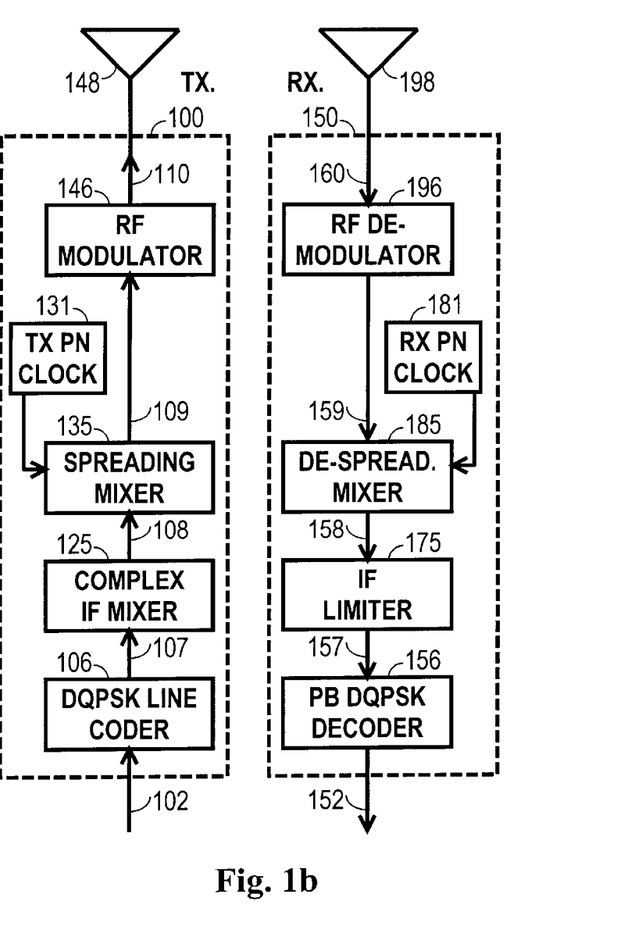
Figure 1C:
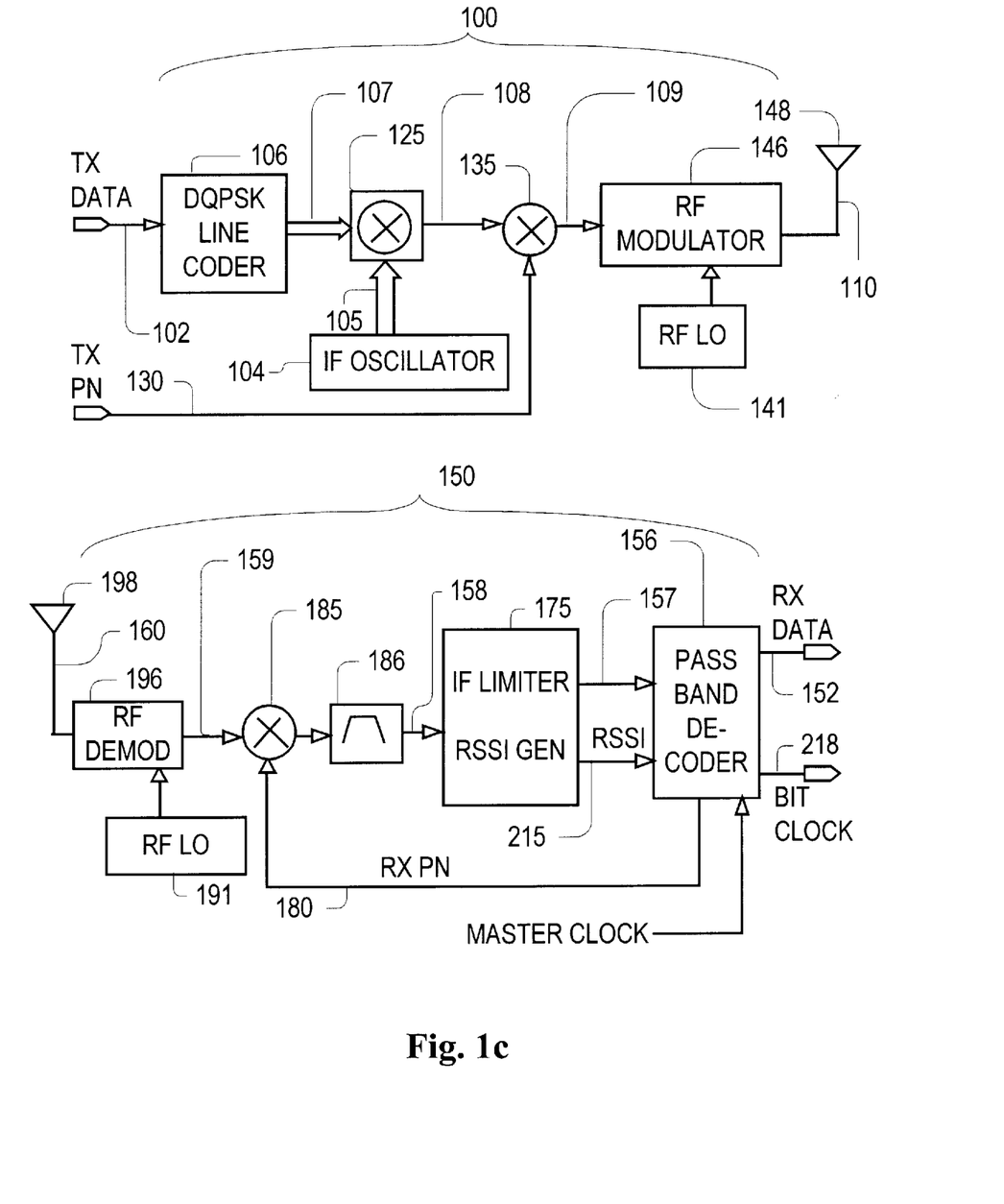

FIG. 1: DQPSK Spread Spectrum Transceiver

The present invention is comprised in the receiver of a digital communication system. Digital receivers are ubiquitous in cordless, mobile, and cellular communications systems, as well as in transmission-line and fiber-optic information networks. The receiver receives a received signal carrying transmitted data and demodulates it to extract the received symbols. The receiver then quantizes the symbols to reproduce the transmitted digital data. The present invention comprises a system and method for generating a symbol-quality signal to monitor the symbol clock used in demodulating the received signal. In a preferred embodiment, the invention is comprised in a cordless telephone system that uses direct sequence spread spectrum techniques and differential quadriphase shift keying (DQPSK) to convey data between transceivers.

FIG. 1a is a representative view of a time-division duplexing (TDD) transceiver 10 that communicates with a remote transceiver (not shown) through a direct sequence spread spectrum signal. A block diagram of the transceiver's signal-processing components is shown in FIG. 1b. The components and the associated signals in the transceiver are further described in FIG. 1c. The invention is preferably comprised in such a transceiver 10, which has a local transmitter 100 that transmits a radio frequency (RF) transmit signal 110 to the remote transceiver, and a local receiver 150 that receives an RF received signal 160 from the remote transceiver.

As shown in FIG. 1b, a DQPSK line coder 106 in the transmitter 100 receives a stream of transmitted data 102 and encodes it into a complex baseband transmit signal 107 that comprises a series of information symbols each with a duration T. In one embodiment of the invention, the symbol period T is 15.625 μs, implying a symbol rate of 64 kS/sec. The baseband transmit signal 107 is upconverted to an intermediate-frequency (IF) transmit signal 108 in a complex IF mixer 125. In one embodiment of the invention, this first intermediate frequency is IF1=10.7 MHz. A spreading mixer 135 receives the transmit signal 108 and multiplies it by a pseudo-random noise (PN) sequence that serves as a spreading code. The timing of this PN sequence is controlled by a transmitter PN clock 131.

The multiplication by the transmitter PN sequence spreads the frequency spectrum of the narrowband transmit signal 108. The resulting wideband IF transmit signal 109 is provided to a RF modulator 146 that multiplies it with a radio-frequency tone to generate the RF transmit signal 110. In one embodiment of the invention, this frequency is in the vicinity of 900 MHz. The RF transmit signal 110 is then sent through a transmitting antenna 148 to the remote transceiver (not shown).

The receiver 150 in the transceiver 10 comprises components that reverse the processing steps of those in the transmitter 100. A receiving antenna 198, which is preferably the same physical component as the transmitting antenna 148, receives an RF received signal 160 from the remote transceiver and provides it to an RF demodulator 196. The RF demodulator 196 downconverts the RF received signal 160 to a wideband IF received signal 159 at the first intermediate frequency IF1. The wideband received signal 159 is provided to a despreading mixer 185 that multiplies it by a receiver PN sequence to recover a narrowband IF received signal 158. The timing of the receiver PN sequence is controlled by a receiver PN clock 181.

The received signal 158 is amplitude-limited in an IF limiter 175 to produce an amplitude-limited IF signal 157. The final stage of this embodiment of the receiver 150 is a passband DQPSK decoder 156 that receives the limited signal 157 and decodes its symbols to produce a stream of received data 152.

FIG. 1c is a schematic showing more detail of the direct sequence spread spectrum transceiver. In the transmitter 100, the digital data 102 are provided to the DQPSK line coder 106. The digital data 102 are encoded into the baseband signal 107 by the DQPSK line coder 106. The baseband signal 107 is a complex signal: it comprises an I (in-phase) component and a Q (quadrature-phase) component; these components carry the DQPSK symbols which represent the transmitted data 102. An IF oscillator 104 generates a complex sinusoidal IF carrier wave 105 for the complex IF mixer 125. The IF mixer 125 multiplies the baseband signal 107 with the intermediate-frequency (IF) carrier 105. This carrier 105 is a complex carrier with a sinusoidal I component and a sinusoidal Q component that is 90° offset in phase from the I component. The result of the multiplication in the mixer 125 is the DQPSK IF transmit signal 108. This signal 108 can be described as a tone at the IF1 carrier frequency with one of four discrete phases, each separated by an integral multiple of $\pi/2$. The phase remains constant for a duration of time T, the symbol period, and then changes as dictated by the next DQPSK symbol. The differences in phase angle between successive information symbols represent the transmitted data 102. Since there are four possible carrier phase values, each symbol represents two bits of transmitted data. The frequency IF1 of the IF carrier 105 is determined by the IF oscillator 104.

The spreading mixer 135 multiplies the transmit signal 108 by a transmit PN signal 130 that carries the transmitter PN sequence. The PN signal 130 is a pseudo-random sequence of binary values that persist for a fixed duration. These values, or "chips," are +1's and -1's ordered according to the PN sequence. Each chip has a duration substantially less than the duration T of an information symbol, so the effect of the multiplication in the spreading mixer 135 is to broaden the spectrum of the transmit signal 108. The timing of the transmitter PN sequence in the transmit PN signal is governed by the transmitter PN clock 131 from FIG. 1b. The output of the spreading mixer 135 is the wideband IF transmit signal 109, a direct sequence spread spectrum signal.

The wideband transmit signal 109 is upconverted to the higher radio frequency by the RF modulator 146. The RF modulator 146 multiplies the wideband transmit signal 109 by a radio frequency tone from a local (transmit) RF oscillator 141, eliminates undesirable mixing products, and provides power amplification in order to generate the RF transmit signal 110 suitable for transmission. The frequency of the transmit RF oscillator 141 determines the frequency of the RF transmit signal 110 through normal operation of the RF modulator 146, according to techniques well-known in the art.

The RF transmit signal 110 is efficiently radiated by the transmitting antenna 148 through a transmission medium, such as air, to a remote transceiver (not shown). The remote transceiver likewise transmits an RF signal that is received by the receiving antenna 198 of the local receiver 150 and coupled into the RF demodulator 196.

In the receiver 150, the RF demodulator 196 amplifies the RF received signal 160 within a selected bandwidth and downconverts the result to an intermediate frequency determined by the frequency of a local (receive) RF oscillator 191. The frequency of the receive RF oscillator 191 is specified so that the downconversion of the RF received signal 160 results in the wideband received signal 159 at some convenient desirable frequency. If the RF oscillators 141 and 191 in the local and remote transceivers are constrained to oscillate at substantially the same frequency, then the frequency of the wideband IF received signal 159 is substantially the same as the frequency IF1 of the wideband IF transmit signal 109.

The despreading mixer 185 receives the wideband output 159 of the RF demodulator 196 and multiplies the wideband received signal 159 by a receiver PN signal 180. The product of this multiplication is filtered in a bandpass filter 186 to generate a narrowband IF received signal 158. The receiver PN signal 180 is a predetermined sequence of binary values given by a receiver PN sequence. The receiver PN sequence in the receiver PN signal 180 matches the transmitter PN sequence in the transmit PN signal 130, except that the two sequences may differ by a constant offset in time. The timing of the receiver PN sequence in the receiver PN signal is governed by the receiver PN clock 181 in FIG. 1b.

The PN sequence is typically a periodic sequence: it comprises a repeated predetermined sequence of chips. This repeated sequence, or "spreading code," preferably has good randomness qualities of autocorrelation and whiteness. Since this PN sequence is periodic, its timing can be completely described by a PN phase. The PN clocks 131 and 181 indicate the transmitter PN phase and the receiver PN phase, respectively. In a preferred embodiment of the present invention, the duration of the repeated sequence is substantially equal to the duration T of one DQPSK symbol.

The phase of the PN sequence in the receiver PN signal 180 (the receiver PN phase) is controlled by a symbol and PN timing recovery block 208, as described later, to match the phase of the PN sequence in the wideband received signal 159 (the received PN phase). That is, during the initialization of the communications link, the receiver PN signal 180 is shifted in time so that the start of each of the repeated PN sequences in the receiver PN signal 180 corresponds to the start of a repeated PN sequence in the wideband received signal 159. The process of PN timing recovery comprises matching the receiver PN phase of the receiver PN signal 180 with the received PN phase of the wideband received signal 159. When the receiver PN signal 180 is thus aligned with the wideband received signal 159, the despreading mixer 185 performs the inverse function of the spreading mixer 135, and the filtered output 158 of the despreading mixer 185 has substantially the same characteristics as the IF transmit signal 108.

The bandpass filter 186 rejects undesirable spectral content resulting from imperfections in the phase alignment of the two PN signals 130 and 180. The filter also removes noise components falling outside the passband of the filter 186. The output of the bandpass filter 186 is the narrowband IF received signal 158. Under ideal conditions, the received signal 158 would be an exact replica of the transmit signal 108 from the remote transmitter. In practice, there may be differences between the two signals due to degradation suffered in the communication channel.

The limiter 175 removes amplitude modulation from the received signal 158 to produce the amplitude-limited IF signal 157 in a fashion well-known in the art. The limited signal 157 is a binary signal with two discrete voltage levels representing the instantaneous polarity of the narrowband IF received signal 158.

Another signal generated by the limiter 175 is the received signal strength indicator (RSSI) signal 215. The RSSI signal 215 is an analog signal proportional to the logarithm of the power of the received signal 158. This power, in turn, varies directly with the correlation of the receiver PN signal 180 with the PN sequence in the wideband received signal 159. Thus, the RSSI signal 215 is maximized when these two PN sequences (in the receiver PN signal 130 and in the wideband received signal 159) are aligned. The RSSI signal 215 and the limited signal 157 are both provided to the passband DQPSK decoder 156, which generates the received data stream 152 and the associated bit clock 218.

Figure 2:
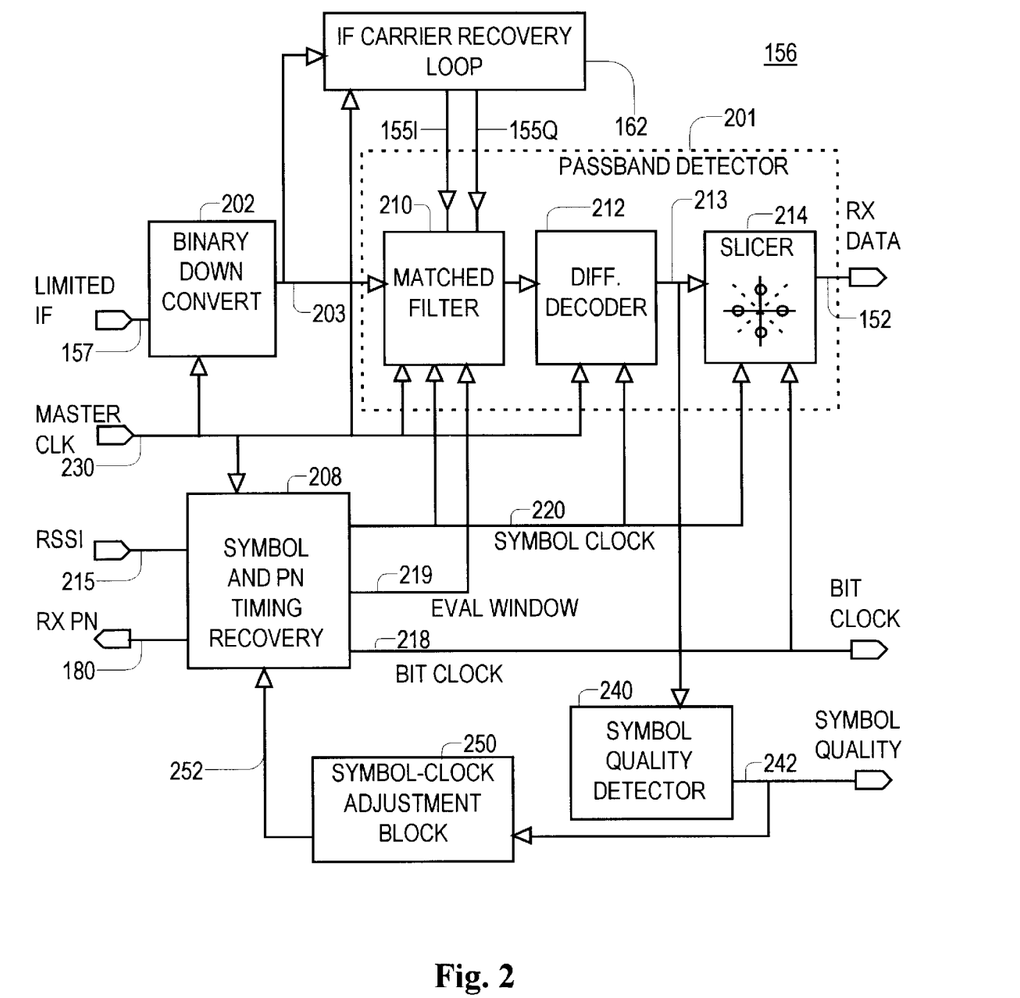
FIG. 2 is a block diagram of the passband DQPSK decoder from FIG. 1.

FIG. 2—Passband DQPSK Decoder

The passband DQPSK decoder 156 is shown in greater detail in FIG. 2. The decoder comprises the symbol and PN timing recovery block 208, a binary downconverter 202, a second-IF carrier recovery loop 162, a digital passband DQPSK detector 201. The decoder also comprises a symbol quality detector 240 and a symbol-clock adjustment block 250, which are used to evaluate and refine the symbol clock 220 using novel systems and procedures that are described below.

The binary downconverter 202 downconverts the limited signal 157 from the first intermediate frequency IF1, preferably 10.7 MHz, to a second-IF received signal 203 at a lower second intermediate frequency IF2, preferably 460.7 kHz. The purpose of the downconversion is to allow adequate oversampling of the IF2 received signal 203 at the rate of the master clock 230 in the passband DQPSK decoder 156.

The symbol and PN timing recovery block 208 receives the RSSI signal 215 and performs the PN timing recovery to generate the receiver PN signal 180. The timing recovery block 208 modifies the phase of the receiver PN signal 180 so as to maximize the RSSI signal 215, thereby aligning the phase of the receiver PN sequence to that of the PN sequence in the wideband received signal 159. The timing recovery block 208 also generates the symbol clock 220 by constructing such a signal with an appropriate delay so that it correctly indicates the symbol transitions in the IF2 received signal 203. The initial determination of this delay and the maintenance of a correct value for this delay are accomplished by with the symbol-quality detector 240 and the symbol-clock adjustment block 250 using novel systems and methods, as further described below.

The timing recovery block 208 also generates a bit-clock 218 and an EVAL WINDOW signal 219. The bit clock 218 runs at twice the rate of the symbol clock 220, and indicates the timing of the bits in the received data stream 152. The EVAL WINDOW signal 219 is used by a matched filter 210 in the DQPSK detector 201; in each symbol interval of the symbol clock 220 it indicates a central portion of time during which symbol transitions do not occur. A master clock signal 230 provided to the decoder 156 is a high-frequency digital clock signal that clocks digital processing circuitry in the digital circuits 162, 201, 202, and 208 of the decoder 156.

The carrier recovery loop 162 recovers the frequency of the carrier in the second-IF received signal 203 and produces two signals at the IF2 frequency representing the recovered second-IF carrier 155I and a $\pi/2$ phase-shifted version of the recovered second-IF carrier 155Q.

The digital passband DQPSK detector 201 recovers the data bits from the second-IF received signal 203, given the recovered symbol clock 220, the recovered carrier signals 155I and 155Q, the EVAL WINDOW signal 219, and the bit clock 218. The passband detector 201 generates the received data output 152, which matches the transmitted data 102 except where reception errors occur.

The symbol-quality detector 240 receives the output of the differential decoder 212, and evaluates it to generate a symbol-quality signal 242. The output from the differential decoder 212 is a complex-valued digital signal representing the differentially-decoded symbols in the IF2 received signal 203. As discussed below, the symbol-quality signal 242 indicates the degree by which the differentially decoded symbols differ from the expected constellation points.

Passband Detector

FIG. 2 also illustrates some of the internal components comprising the passband detector 201. The passband detector 201 is achieved with a digital matched filter 210, differential decoder 212, and slicer 214. The all-digital implementation is made feasible in practice by the application of the IF limiter 175 to the received signal 158 so that the output 157 of the limiter is a 2-level signal representing the arithmetic sign of 158 only. The IF limiter 175 is a non-linear device the output of which is discrete-valued but continuous in time. The quantization in amplitude benefits the passband detector 201 by dramatically reducing the complexity of computation. The continuous-time character allows inference of phase to any arbitrary resolution.

The digital matched filter 210 receives the IF2 received signal 203. It also receives the symbol clock 220 from the symbol and PN timing recovery block 208 and the recovered carrier signals 155I and 155Q from the IF carrier recovery loop 162. The digital matched filter is uniquely implemented in simple digital hardware as described in detail later. The digital matched filter correlates the IF2 received signal 203 against each of the recovered carrier waveforms 155I and 155Q and generates an output indicative of the phase of the current symbol with respect to the recovered carrier. This output is a baseband digital signal carried in a first predetermined number of bits. The EVAL WINDOW signal 219 determines the correlation interval for each received symbol. The symbol clock 220 determines the sampling rate of the matched-filter output.

The differential decoder 212 produces a complex-valued signal 213 that indicates the phase difference between any two successive symbols. Its inputs are the complex-valued output of the matched filter 210, the symbol clock 220, and the high frequency master clock 230 for performing digital calculations. The differential decoder performs the multiplication of the current matched filter output sample with the complex conjugate of the previous sample. The multiplication is preferably performed using serial multiplication techniques well-known in the art in order to reduce complexity of the digital hardware required for the calculation.

The slicer 214 receives the complex-valued output from the differential decoder 212 and quantizes the signal to generate the received data signal 152, which is the output of the passband DQPSK receiver 150, at the bit rate indicated by the bit clock 218.

The symbol-quality detector 240 is coupled to the differential decoder 212, and receives the complex-valued output 213 therefrom. The symbol-quality detector 240 analyses the I and Q components of the complex signal 213 and generates a symbol-quality signal 242 that indicates how near the symbols carried in these components are to the expected symbols in the QPSK constellation. In another embodiment of the invention, the symbol-quality detector receives the detected symbols directly from the complex output generated by the matched filter.

The symbol-clock adjustment block 250 is coupled to the symbol quality detector and to the symbol and PN timing recovery block 208. The adjustment block 250 receives the symbol-quality signal 242 and adjusts the symbol clock 220 to maximize the signal 242. The adjustment is performed by providing an IF delay value, described below, to the timing recovery block 208.

IF Delay

In a preferred embodiment of the invention, the repeated PN sequence, also known as the spreading code, repeats with a period substantially equal to the symbol period T. Thus (with an appropriate definition of the start of this repeated sequence), the start of the repeated sequence in the received wideband signal 159 also marks a symbol transition in that signal 159. However, the PN timing recovered by the timing recovery block 208 is preferably not directly used to indicate symbol transitions in the matched filter 210. This is because the signal path between the despreading mixer 185 and the matched filter 210 (shown in FIG. 1c) introduces a group delay in the symbol timing. This delay is a result of the symbol-propagation time through the passband filter 186, the IF limiter 175, and the binary downconverter 202. In general, this delay is not readily predetermined by design considerations, since one or more of these elements may have a relatively low design tolerance. For example, if a filtering element in any of these components is constructed of RC circuit elements, then the delay introduced by that component depends on the particular physical characteristics of the element. Since such characteristics may vary between elements, even if they are produced by the same process, the group delay will in general vary from one transceiver to another. The group delay may also vary depending on operating temperature and other operating conditions, and is thus generally an unknown delay.

To provide an appropriate symbol timing to the matched filter 210 and other elements in the passband detector 201, the timing recovery block 208 recovers the PN timing used to generate the receiver PN signal 180 and generates the symbol clock 220 with a shift in time from the PN timing. The shift, called the IF delay, is chosen so that it matches the group delay of the symbol timing between the despreading mixer 159 and the matched filter 210. Thus, the IF delay synchronizes the symbol clock 220 with the symbol transitions in the IF2 received signal 203.

In the present invention, the transceiver is preferably analyzed after production, and an optimal delay value that matches the group delay is measured. The receiver is then programmed with this optimal delay value as its IF delay. The transceiver then uses the pre-programmed IF delay during operation to set the timing of the symbol clock 220 in relation to the recovered PN timing. In a preferred embodiment, the transceiver also adjusts the IF delay during operation to further optimize the synchronization of the symbol clock 220 with the symbol boundaries in the IF2 received signal 203.

Symbol-Quality Detector and Symbol-Clock Adjustment Block

Figure 3:
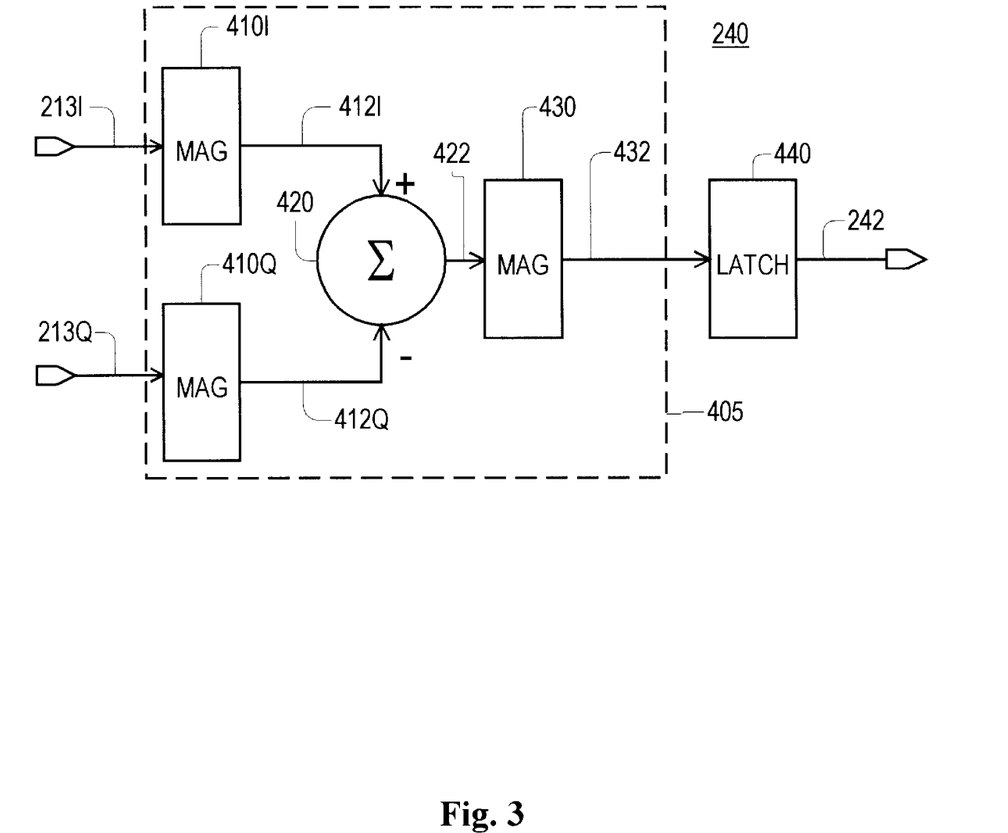
FIG. 3 is a block diagram of the symbol-quality detector from FIG. 2.

FIG. 3 shows one embodiment of the symbol-quality detector 240, which measures the alignment of the received symbols (as detected by the matched filter 210 and the differential decoder 212 from FIG. 2) with the expected QPSK symbols. The symbol-quality detector 240 receives the I component 213I and the Q component 213Q, of the complex signal 213 (produced by the differential decoder 212 from FIG. 2). In response to these inputs, the symbol-quality detector 240 operates to generate an output representing the quantity $|||I|-|Q|||$. This output is the symbol quality signal 242: it is inversely related to the group delay, that is, the symbol quality signal 242 increases monotonically as the magnitude of the group delay is reduced.

If the symbol clock 220 is correctly synchronized with the symbol transitions in the IF2 received signal 203, then the I and Q components of the IF2 received signal 203 have fixed values over each symbol interval indicated by the symbol clock 220. The resulting I and Q components 213I and 213Q of the differential decoder's output 213 should then be one of the four signal-space points of the QPSK constellation: $(I,Q)=\{(A,0), (0,A), (-A,0), (0,-A)\}$, where A is the amplitude of the complex signal 213. For all of these points, the quantity $|||I|-|Q|||$ has a value of A. If, however, the symbol clock 220 provided to the matched filter 210 is not correctly synchronized with the symbol transitions in the input 203 to the matched filter, then the received symbols indicated by the I and Q components will not be aligned with the constellation of QPSK symbols. Under these conditions, the quantity $|||I|-|Q|||$ has a value between 0 and A, with an expected value that decreases from A monotonically with the deviation of the symbols in 213I and 213Q from the constellation points. Thus, the symbol quality signal 203, which indicates the quantity $|||I|-|Q|||$, is a good measure of the synchronization of the symbol clock 220. By adjusting the symbol clock 220 so that the symbol quality signal 203 is maximized, the transceiver can optimize the synchronization of the symbol clock.

To generate the symbol-quality signal 242, one embodiment of the symbol-quality detector 240, as shown in FIG. 3, comprises a logic block 405 and a latch 440. The logic block 405 calculates receives the inputs 213I and 213Q that carry the I and Q components of the complex signal 213, and calculates the quantity $|||I|-|Q|||$. This quantity is carried in the logic block's output 432, which is an unlatched version of the symbol quality signal. This output 432 is provided to the latch 440, which updates its output only during receive cycles of the TDD transceiver. The output of the latch is the symbol-quality signal 242.

In one embodiment of the invention, the functions of the logic block are performed by a digital signal processor. In another embodiment, also shown in FIG. 3, the logic block comprises three magnitude detectors 410I, 410Q, and 430, and an adder 420. Two of the magnitude detectors receive the inputs to the symbol-quality detector 240. One of these magnitude detectors 410I receives the I component 213I of the output 213 from the differential decoder, and the other 410Q receives the Q component 213Q of the output 213. These magnitude detectors 410I and 410Q take the absolute values of their inputs and generate the magnitude signals 412I and 412Q, respectively. The adder 420 is coupled to these two magnitude detectors 410I and 410Q, and adds one of these signals with the compliment of the other, thereby generating a difference signal 422. The third magnitude detector 430 is coupled to the adder 420 and to the latch 440; this magnitude detector receives the difference signal 422 and calculates its absolute value. The output 432 of the third magnitude detector has the value $||I|-|Q||$ and is the unlatched version of the symbol-quality signal.

The symbol-clock adjustment block 250 receives the symbol quality signal 242 from the symbol quality detector and analyzes it to generate an updated value of the IF delay. This delay is provided to the symbol and PN timing recovery block 208 through the symbol-clock output signal 252. The symbol-recovery block uses the feedback provided from the symbol-quality signal to optimize the value of the IF delay, thereby optimizing the synchronization of the symbol clock 220 with the symbol transitions in the IF2 received signal 203 that is the input to the matched filter 210. Thus, the symbol-clock adjustment block shifts the phase of the symbol clock to synchronize it with the received symbols. In a preferred embodiment of the invention, the symbol-clock adjustment block is a microprocessor or digital-signal processor comprised in the transceiver, and the feedback algorithms it uses to optimize the IF delay are provided in software to the processor.

Figure 4:
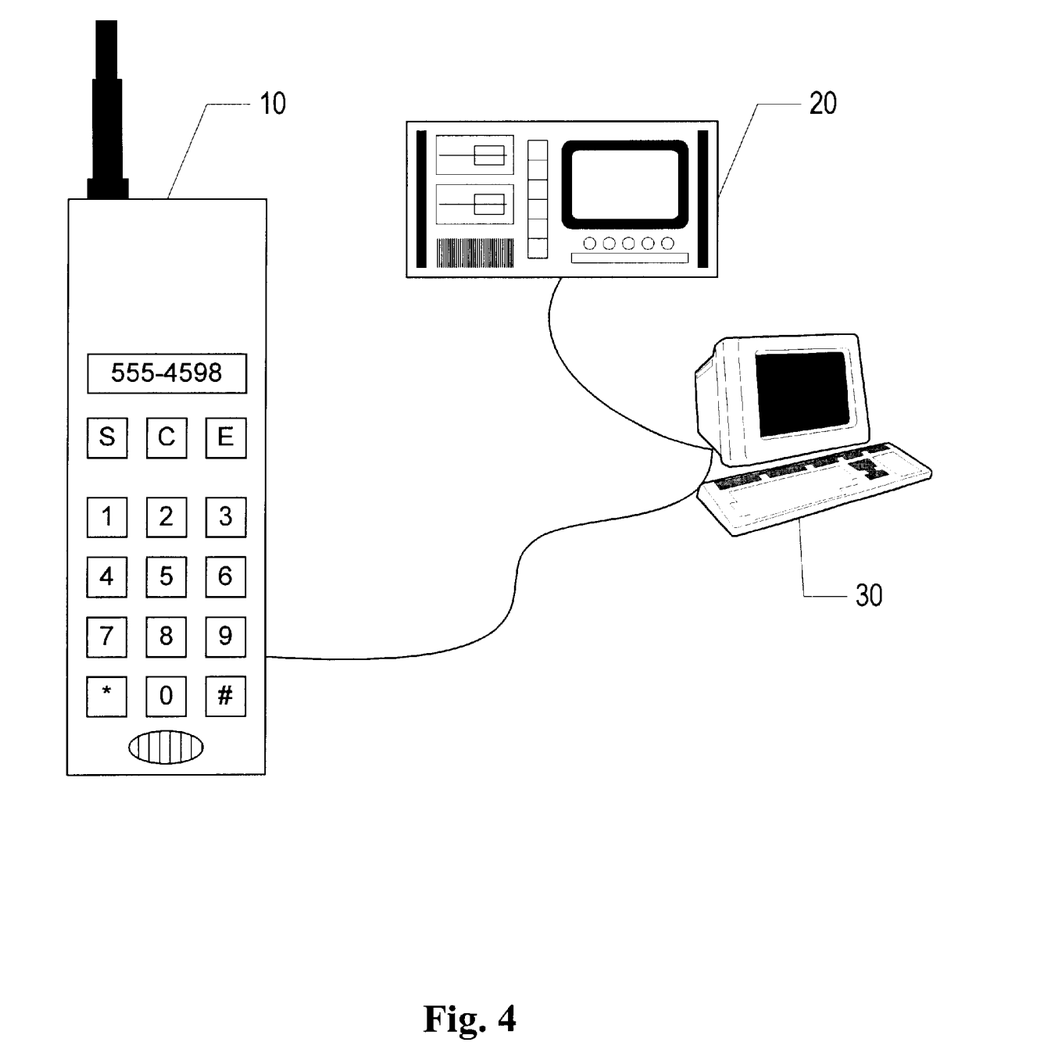
FIG. 4 illustrates a test-bench configuration for configuring the transceiver with a pre-programmed IF delay.
Figure 5:
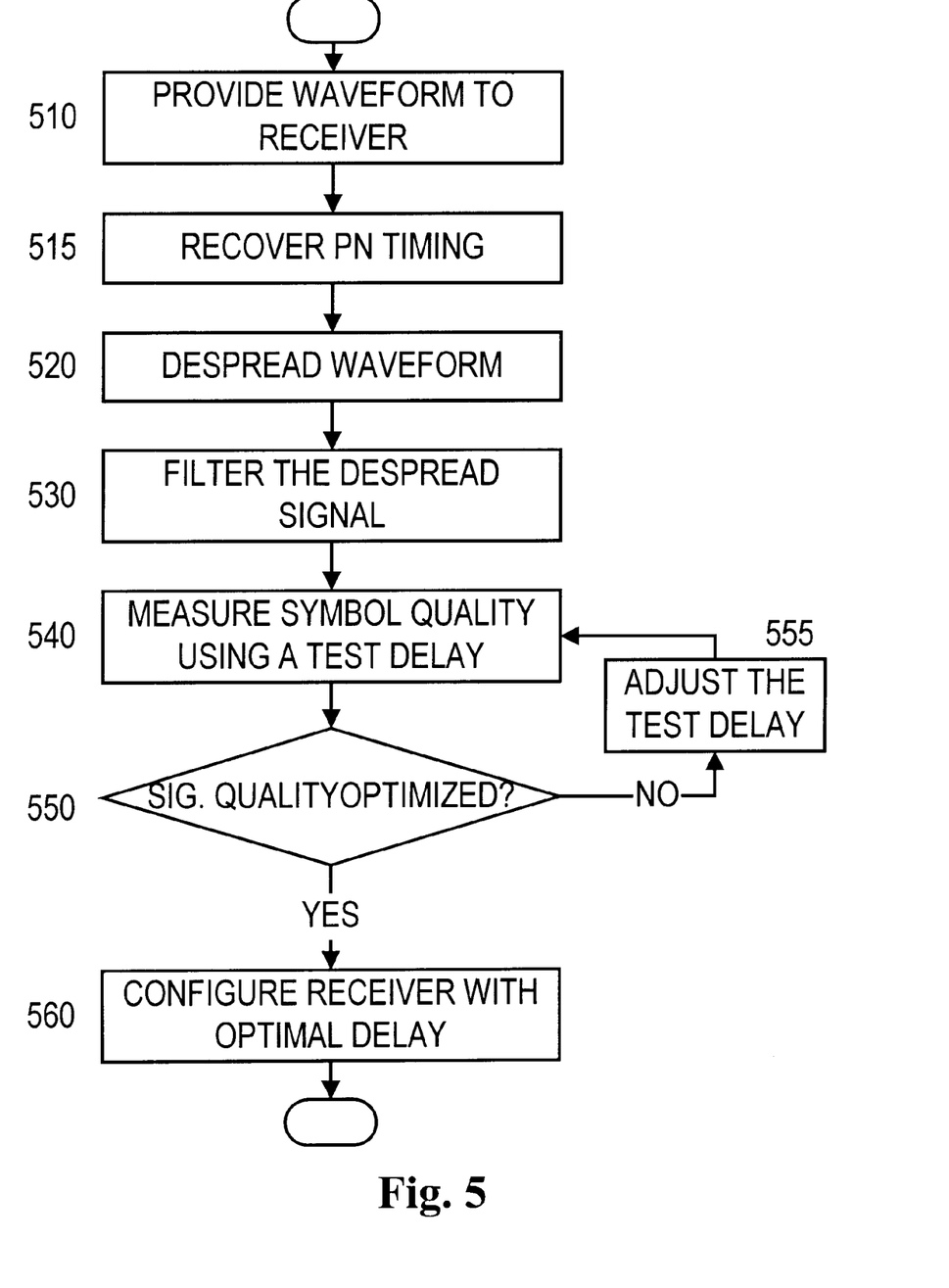
FIG. 5 is a flowchart for configuring the transceiver with the pre-programmed IF delay.

FIGS. 4 and 5: Configuring the Initial IF Delay

FIG. 4 is a representative view of an arrangement for configuring the transceiver 10 with its initial value of the IF delay. The configuring is performed with the transceiver connected to automated test equipment 30. In one embodiment of the configuring, the transceiver is also connected to an oscilloscope 20 on which an "eye" diagram of the received signals may be displayed for monitoring the symbol transitions.

A flowchart for the procedure for configuring the transceiver with the IF delay is shown in FIG. 5. In step 510, the receiver in the transceiver is provided with a waveform that simulates the received spread-spectrum data signals it receives during operation. In a preferred embodiment of the present invention, this waveform is provided as an RF received signal 160 to the RF demodulator 196. In other embodiments, the waveform is injected into the transceiver at other points, for example, as a wideband IF received signal 159 provided to the despreading mixer. The waveform can have a predetermined or randomly-generated sequence of DQPSK symbols. In a preferred embodiment, the sequence of symbols is predetermined, and comprises symbol transitions that allow the symbol-quality detector in the transceiver to make a good measure of the symbol quality. The transceiver then recovers its PN timing in step 515 and despreads the waveform into a despread signal in step 520. In step 530, the despread signal is then filtered and processed, preferably through the transceiver components 186, 175, and 202. This filtering and processing introduces the unknown group delay in the symbols of the received signal.

The transceiver then uses a test delay, intended to match the unknown delay, as the IF delay by which it shifts the symbol clock 220 from the PN timing. With this test delay, the transceiver measures the symbol quality with the symbol quality signal 242 in step 540. Until the signal quality is optimized, as determined by evaluation of the symbol quality signal in step 550, the receiver repeatedly adjusts the test delay and re-measures the symbol quality in steps 555 and 540. The adjustments are made using one or more algorithms for testing and modifying a control parameter (the IF delay) in response to a measured indicator (the symbol quality signal), as would be known to one skilled in the art of feedback control.

When the symbol-quality is sufficiently maximized, indicating that the test delay has been adjusted into an optimal delay, the receiver is configured with the value of the optimal delay in step 560 for use as the IF delay during operation. The value of the optimal delay is preferably stored in a nonvolatile memory in the transceiver. The nonvolatile memory may be any of several types of storage, including semiconductor storage devices such as a RAM (random-access memory), a ROM (read-only memory), an EPROM (erasable and programmable read-only memory), or an EEPROM (electrically erasable and programmable read-only memory).

Carrier Recovery Loop—Further Description

The detector 201 requires a supplemental circuit that recovers the frequency of the IF carrier. Thus the preferred embodiment of the receiver 150 comprises the digital carrier recovery loop 162 that tracks the frequency of the IF carrier of the IF2 received signal 203 and supplies a replica of its complex carrier, having at least a substantially matching frequency, to the matched filter 210. The carrier recovery loop 162 is implemented with a digitally-controlled digital oscillator that employs a digital phase error detector. A digitally controlled digital oscillator is a finite state machine in which the current state represents the modulo-$2\pi$ phase of the oscillator output. The state (i.e. the phase) is advanced by a fixed-period sampling clock, generally assumed to be much greater than the desired frequency of oscillation. The resolution of the phase is limited by the width, in bits, of the state variable. For example, 360 possible states can represent 1 degree of resolution whereas 3600 states can represent 0.1 degree resolution. The phase error detector modulates the increment in the state variable according to a measured error criterion and does not produce an error when the incoming signal matches in phase to any $\pi/2$ shift of the recovered carrier in order to reject the modulated information signal. The number of phase states in the preferred embodiment is such that 90 degrees is exactly described by a four times an integral number of states, so that the two most significant bits of the state variable represent the phase quadrant. These two bits accurately reflect the arithmetic signs of the real and imaginary components of the recovered complex carrier (i.e. the cosine and sine of the phase angle) allowing the circuit to deliver to the matched filter an accurate representation of the complex carrier on two binary signals.

The IF2 received signal 203 is fed to the digital IF recovery loop 162, the purpose of which is to track the frequency of the IF carrier in the IF2 received signal 203. The high-frequency master clock 230 is the second input to the IF recovery loop and it clocks digital processing circuitry. The IF recovery loop tracks the IF carrier in the IF2 received signal 203 and is insensitive to the QPSK modulation imposed upon the carrier. The output 155I is a binary signal representing the polarity of the recovered IF carrier. The output 155Q is a binary signal representing the polarity of the recovered IF carrier phase-shifted by $\pi/2$, or, equivalently, multiplied by $-j$, where j is defined by $j=\sqrt{-1}$. Both output signals 155I and 155Q are discrete-time signals sampled at the master clock 230 sampling rate. Furthermore, the output signal 155I is preferably aligned in phase with any arbitrary $n\pi/2+\pi/4$ phase-shift of the actual IF carrier in the IF2 received signal 203 (n=0,1,2,3).

Passband Detector—Further Description

Several technical advantages are achieved in the particular arrangement of the elements of the passband decoder 156. First, because the decoder 156 directly couples to the limited IF signal 157, all circuitry can be realized with digital logic, with the exception of comparators used in the binary downconverter 202 to translate the signal levels of the limited IF signal 157 to digital logic levels. This is because the limited IF signal has only two voltage levels and therefore represents a binary-valued signal. All-digital realization improves manufacturability by making a design more repeatable and less sensitive to noise.

Second, the implementation of the matched filter 210 simultaneously filters, downconverts, and samples the IF2 received signal 203, making it reliable and inexpensive. The EVAL WINDOW signal 219 allows effective and inexpensive rejection of corruptive noise in the IF2 received signal 203 caused by collapse of the IF envelope at symbol boundaries characteristic of band-limited PSK systems.

Third, the phasing of the recovered carrier signals 155I and 155Q maximizes the magnitude of the expected matched filter output versus other recovered phase relationships.

Fourth, the matched filter is tolerant of any arbitrary phase of recovered carrier relative to the actual carrier of the IF2 received signal 203. Phase shifts other than the target degrade performance of the receiver by reducing the magnitude of the expected matched filter output, but do not result in catastrophic failure. Therefore, the matched filter 210 can operate with degraded performance even when the IF carrier recovery loop 162 is not precisely tracking the IF carrier in the IF2 received signal 203.

Fifth, the differential decoder operates at the comparatively slow symbol rate, allowing multiplication operations to be done using bit-serial arithmetic, reducing overall complexity in comparison to parallel multiplication techniques. An alternative receiver arrangement placing the symbol-to-symbol phase-differencing function of the differential decoder 212 before the matched filter would require significant memory to store samples of the IF2 received signal 203 for an entire symbol period.

Furthermore, the output of the differential decoder contains a multi-bit representation of the symbol phase without loss of any of the correlation information obtained from the matched filter. Slicing is therefore performed in the slicer 214 using all of the available correlation information. Furthermore, the slicer is capable of completely isolating the slicing criterion, that is the symbol phase, from the differential decoder 212 output, rejecting magnitude modulation in the matched filter 210, which results from corruptive noise.

Finally, this configuration of the passband detector 201 easily adaptable to coherent QPSK or BPSK demodulation by removal of the differential decoder 212 and simple modification of the slicer 214 to remap output codes upon detection of a predetermined initialization sequence. It is further easily adaptable to DBPSK demodulation by a simple modification of the slicer 214 alone.

Although described here particularly for a DQPSK receiver, the invention can also be used in correlator-type receivers using other modulation schemes as well. For example, a receiver for quadrature amplitude modulation (QAM) signals can also use this invention to evaluate its symbol clock, as can receivers of signals encoded with binary phase-shift keying (BPSK), coherent QPSK, offset-QPSK (OQPSK), minimum-shift keying (MSK), and other special cases and variants of QPSK.

It is to be understood that multiple variations, changes and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A method for configuring a direct-sequence spread-spectrum quadriphase-shift-keying (QPSK) communication receiver to perform symbol clock recovery, wherein the receiver is configured with a repeated spreading code, the method comprising:

providing a known waveform to the spread-spectrum receiver, wherein the known waveform comprises a sequence of predetermined QPSK symbols, wherein each symbol in the sequence of predetermined symbols has a symbol duration substantially equal to a length of the repeated spreading code, wherein the known waveform is modulated by the repeated spreading code, and wherein symbol transitions in the known waveform are synchronous with starts of the repeated spreading code in the known waveform;

the spread-spectrum receiver determining a first timing that indicates the starts of the repeated spreading code in the known waveform;

the spread-spectrum receiver despreading the known waveform with the spreading code to produce a despread QPSK signal;

the spread-spectrum receiver filtering the despread signal, wherein said filtering generates a filtered signal, and wherein said filtering delays the despread signal, thereby introducing an unknown delay between symbol transitions in the filtered signal and the first timing;

performing a measurement using a test delay after said filtering, wherein:
the test delay differs from the unknown delay by an unknown error value;
said performing a measurement uses a second timing delayed from the first timing by the test delay, wherein said second timing is intended to approximate the symbol transitions in the filtered signal; and
said performing a measurement produces a symbol-quality signal that is inversely related to the unknown error value;

adjusting the test delay in response to said performing a measurement to maximize the symbol-quality signal; and repeating said steps of performing a measurement using a test delay and adjusting the test delay one or more times to maximize the symbol-quality signal, wherein said repeating produces an optimal delay value that closely approximates the unknown delay; and configuring the spread-spectrum receiver with the optimal delay value, wherein the spread-spectrum receiver is operable to use the optimal delay value during communications to perform symbol clock recovery.

2. The method of claim 1, further comprising the spread-spectrum receiver communicating after said configuring the spread-spectrum receiver with the optimal delay value, wherein said communicating comprises:

receiving a data-bearing waveform;

despreading the data-bearing waveform with the spreading code to produce a despread data signal, wherein:
the data symbols in the sequence of QPSK data symbols are separated by symbol boundaries, wherein the symbol boundaries occur periodically in time; and
said despreading generates a spreading-code clock signal that indicates a repetition of the spreading code and is substantially synchronous with the symbol boundaries;

filtering the despread data signal, wherein said filtering delays the despread data signal by an unknown data delay; and generating a symbol clock signal, wherein the symbol clock signal comprises a delayed version of the spreading-code clock signal, wherein the delayed version of the spreading-code clock signal is delayed by the optimal delay value to match the unknown data delay of the despread data signal.

3. The method of claim 1, wherein:

the data symbols in the sequence of QPSK data symbols are separated by symbol boundaries, wherein the symbol boundaries occur periodically in time;

the spread-spectrum receiver represents the sequence of predetermined QPSK symbols by a complex signal comprising an in-phase (I) component and a quadrature-phase (Q) component, wherein the complex signal undergoes transitions at the symbol boundaries;

said despreading generates a spreading-code clock signal that indicates a repetition of the spreading code and is substantially synchronous with the symbol boundaries of the despread signal; and said performing a measurement using a test delay comprises:
generating an estimated symbol clock signal by delaying the spreading-code clock signal by the test delay;
generating the symbol-quality signal based on the complex signal and the estimated symbol clock signal.

4. The method of claim 3, wherein said generating the symbol-quality signal comprises:
generating a first absolute value of the I component of the complex signal;
generating a second absolute value of the Q component of the complex signal;
subtracting the first absolute value from the second absolute value to generate a difference signal;
calculating a magnitude of the difference signal to produce the symbol-quality signal.

5. The method of claim 1, wherein said configuring comprises storing the optimal delay value in a random-access memory (RAM) in the spread-spectrum receiver.

6. The method of claim 1, wherein said configuring comprises storing the optimal delay value in a read-only memory (ROM) in the spread-spectrum receiver.

7. The method of claim 1, wherein said configuring comprises storing the optimal delay value in an erasable programmable read-only memory (EPROM) in the spread-spectrum receiver.

8. The method of claim 1, wherein said configuring comprises storing the optimal delay value in an electrically erasable and programmable read-only memory (EEPROM) in the spread-spectrum receiver.

9. The method of claim 7, wherein said configuring is repeated during recalibration of the spread-spectrum receiver.

* * * * *